3,784,521
METHOD OF ACCELERATING THE CURE OF POLYURETHANES

Anthony F. Finelli and John R. Stanley, Akron, Ohio, assignors to The Goodyear Tire & Rubber Company, Akron, Ohio
No Drawing. Filed Apr. 11, 1972, Ser. No. 243,044
Int. Cl. C08g 22/16, 22/34
U.S. Cl. 260—75 NB                  5 Claims

ABSTRACT OF THE DISCLOSURE

The cure of liquid polyurethane reaction mixtures containing a ketone diamine curative is accelerated by the use of polyhydroxy benzenes and polyhydroxyl carbonyl benzenes containing two to four hydroxyl groups when used in about one-tenth to two parts per hundred parts of the polyurethane.

---

This invention relates to a method of enhancing the cure rate of a liquid polyurethane reaction mixture containing a ketone-diamine curative. Very specifically, this invention relates to obtaining polyurethanes having improved resistance to discoloration or deterioration when exposed to ultra-violet light.

The Muller patent, U.S. 2,620,516 provides a method for selecting certain isocyanates and diamines to obtain a couple having preferred pot life but it does not teach how to utilize those complexes that do not have the preferred pot life range. Recently, it has been discovered that if the diamine is treaed in a ketone such as acetone, methyl ethyl ketone and methyl isobutyl ketone, the resulting diamine curative or complex has a pot life different from that predicted by the teachings of U.S. 2,620,516. For instance, the pot life is usually much longer when the the ketone-diamine curative is used. Where the humidity is very low, then the time required to convert the liquid polyurethane reaction mixture to a solid is too long to be useful economically or practically.

Not only does the ketone-diamine curative slow down the cure rate, but when the organic polyisocyanate is alicyclic or aliphatic in nature, the resulting polyurethane is relatively susceptive to ultra-violet degradation.

Therefore, the principal object of this invention is to provide accelerators or catalysts which enhanced the cure rate of the polyurethane reaction mixture without deleteriously affecting the physical properties of the resulting polyurethane.

A very limited object of this invention is to provide a class of accelerators that imparts improved ultra-violet resistance to the polyurethane.

The objects of this invention are achieved by preparing a polyurethane reaction mixture comprising a polymeric reactive hydrogen containing material, an organic polyisocyanate and an organic diamine-ketone curative and effecting the cure of the rection mixture in the presence of a catalytic amount of an accelerator selected from the class consisting of polyhydroxyl phenones, and polyhydroxylbenzene where the hydroxyls of the polyhydroxylbenzene are in at least the vicinal position relative to each other.

Representative accelerators of this class are 2,2',4,4'-tetrahydroxybenzophenone, 2,2'-dihydroxy-4,4' - dimethoxybenzophenone, 2,4-dihydroxybenzophenone, 2,4,5-trihydroxybutyrophenone, pyrogallol, catechol and propyl gallate. Use of these accelerators can reduce pot life and tack-free time effectively. Also, the use of the polyhydroxycarbonyl containing benzenes not only accelerates the reaction rate but imparts improved ultra-violet resistance to the polyurethane.

The nature of this invention can be made readily appreciated by reference to the representative examples wherein all parts and percentages are by weight unless otherwise designated.

EXAMPLE I

Two moles of a polytetramethylene ether glycol of 1000 molecular weight were blended with a mole of a polytetramethylene ether glycol of 2000 molecular weight. This polytetramethylene ether glycol mixture was then reacted with 4,4'-dicyclohexylmethane diisocyanate, herein after referred to as $H_{12}MDI$ to form a prepolymer having an excess of isocyanate groups. Sufficient of this prepolymer was dissolved in toluene to yield about 2 percent NCO solution and then was mixed with a methyl ethyl ketone-methyl isobutyl ketone solution in isophorone diamine, simultaneously with the mixing of the isophorone diamine and the prepolymer, the accelerator dissolved in methyl ethyl ketone was added and mixed therein. This liquid reaction mixture was then drawn down into a film on a polyethylene slab and allowed to cure at room temperature under a low relative humidity of approximately 20 to 30 percent.

Table 1 lists the tack-free time and pot life of the above reaction mixture with the additive used at the level of 0.3–0.5 part per 100. The tensile and elongation are given on the original sample and after aging 14 days in water at 158° F. It should be noted that the use of these accelerators materially improves the tensile of the sample after exposure for 14 days to water vapor at 158° F. This is unobvious and unexpected as this hot water treatment normally reduces tensile.

Also, use of these accelerators gives the cured sample a better surface appearance and greater freedom from fritting (cracking and pitting) in the surface interface. This difference in appearance is listed as "clear" and "pitted" in Table 1.

TABLE 1

| Additive | Tack free time, minutes | Pot life, minutes | Physical appearance after 24 hrs. | Ultimate T & E[1] | T & E[1] after 14 days, $H_2O$, 158° F. |
|---|---|---|---|---|---|
| None | 345 | 420 | Pitted | 2,400/415 | 2,100/405 |
| 2,2',4,4'-tetrahydroxybenzophenone | 75 | 120 | Clear | 3,000/500 | 3,650/480 |
| 2,4-dihydroxybenzophenone | 145 | 260 | do | 3,300/580 | 4,200/520 |
| 2,4,5-trihydroxybutyrophenone | 63 | 78 | do | 3,300/570 | 4,900/550 |
| 2,4-dihydroxybenzophenone | 180 | 265 | do | 3,100/575 | 4,850/480 |
| Catechol | >180 | >240 | do | | |
| Pyrogallol | 145 | >180 | do | 4,000/525 | 4,300/570 |

[1] T & E = Tensile and Elongation.

Prepolymers A and B were formulated as shown in Tables 2, 3, 4 and 5, with various amounts of accelerators and curatives and the pot life was determined on the resulting mixtures. In these tables THB designates 2,2',4,4'-tetrahydroxybenzophenone, MOCA/MEK designates a blend of 50 percent methylene bis orthochloroaniline in methyl ethyl ketone that has stood for three days, IPD/MEK-MIBK designates a blend of 20 percent isophorone diamine and methyl ethyl ketone/methyl isobutyl ketone that has stood for three days, and MDA/MEK designates a blend of 20 percent methylene dianiline in methyl ethyl ketone that has stood for three days.

TABLE 2

|  | −1 | −2 | −3 | −4 | −5 |
|---|---|---|---|---|---|
| Prepolymer B | 75 | 75 | 75 | 75 | 75 |
| MOCA/MEK | 8.6 | 8.6 | 8.6 | 8.6 | 8.6 |
| THB |  | .3 |  | .5 |  |
| Propyl gallate |  |  | .3 |  | .5 |
| Pot life (hrs.) | (¹) | 34–41 | 34–41 | 34–41 | 22 |

TABLE 3

|  | −1 | −2 | −3 | −4 | −5 | −6 | −7 | −8 |
|---|---|---|---|---|---|---|---|---|
| Prepolymer B | 75 | 75 | 75 | 75 | 75 | 75 | 75 | 75 |
| IDP/MEK-MIBK | 13.5 | 13.5 | 13.5 | 13.5 |  |  |  |  |
| MDA/MEK |  |  |  |  | 15.8 | 15.8 | 15.8 | 15.8 |
| THB |  | .3 | .5 | .7 |  | .3 | .5 | .7 |
| Pot life (min.) | 82 | 55 | 33 | 24 | 180 | 136 | 107 | 100 |

TABLE 4

|  | −1 | −2 | −3 | −4 | −5 | −6 | −7 | −10 |
|---|---|---|---|---|---|---|---|---|
| Prepolymer A | 75 | 75 | 75 | 75 | 75 | 75 | 75 | 75 |
| MOCA/MEK | 16.3 | 16.3 | 16.3 | 16.3 | 16.3 |  |  |  |
| IDP/MEK-MIBK |  |  |  |  |  | 25.7 | 25.7 | 25.7 |
| Propyl gallate |  | .3 | .5 |  |  | .3 | .5 |  |
| THB |  |  |  | .3 | .5 |  |  |  |
| Pot life (min.) | 46 | 28 | 24 | 40 | 39 | 19 | 16 | 23 |

TABLE 5

|  | −1 | −2 | −3 | −4 | −5 | −6 | −7 | −8 |
|---|---|---|---|---|---|---|---|---|
| Prepolymer B | 75 | 75 | 75 | 75 | 75 | 75 | 75 | 75 |
| IPD/MEK-MIBK | 13.5 | 13.5 | 13.5 | 13.5 |  |  |  |  |
| MDA/MEK |  |  |  |  | 15.8 | 15.8 | 15.8 | 15.8 |
| Propyl gallate |  | .3 | .5 | .7 |  | .3 | .5 | .7 |
| Pot life (min.) | 62 | 43 | 22 | 13 | 160 | 92 | 58 | 52 |

EXAMPLE II

A polytetramethylene adipate of 100 molecular weight was reacted with sufficient 80/20 2,4/2,6 isomeric mixture of toluene diisocyanate to give a prepolymer having free NCO. This prepolymer was diluted with toluene to give a solution having 3.8 percent free NCO, which is referred to hereinafter as Prepolymer A.

Likewise, a 2/1 molar mixture of 1000 and 2000 molecular weight polytetramethylene adipate was reacted with sufficient $H_{12}MDI$, the designation for 4,4'-dicyclohexyl methane diisocyanate to form a prepolymer having free NCO. This prepolymer was diluted with toluene to give a solution having 2.1 percent free NCO, which is referred to as Prepolymer B.

EXAMPLE III

A prepolymer was former by reacting polytetramethylene glycol ether and 4,4'-dicyclohexyl methane diisocyanate and diluted with toluene to give a solution having 2.67 percent free NCO. Seventy-five parts of this prepolymer solution was cured with 16.7 parts of a 20 percent IPD/MEK-MIBK to form a test sheet (Sample A). A second test sheet was made with the same amount of prepolymer and curative except one part of 2,2',4,4'-tetrahydroxybenzophenone in 10 parts MEK was added as an accelerator with the curative to form test sheets (Samples B). These samples A and B were subject to Weatherometer tests and other physical tests. The results of these tests are shown in Table 6:

TABLE 6

| Sample | Accelerator additive | Time of failure in weatherometer (hours) | Original physicals Tensile, p.s.i. | Elongation, percent |
|---|---|---|---|---|
| A | None | 700 | 4,200 | 550 |
| B | 2,2',4,4'-tetrahydroxybenzophenone. | 3,00 | 4,400 | 470 |

Sample A, at the end of 700 hours in the Weatherometer, could be deformed or punctured with the finger, while on the other hand, Sample B, after 3000 hours in the Weatherometer, had a tensile of 3000 p.s.i. and an elongation of 550 percent.

The use of accelerator amounts, 0.1 to 2 parts of accelerator per 100 parts of the mixture is desirable, but about 0.3 to 1 part is preferred of the polyhydroxyl benzene or polyhydroxyl carbonyl benzene, which includes the alkyl benzenes where the alkyl group contains 1 to 20 carbon atoms and preferably 1 to 5 carbon atoms. The polyhydroxyl radicals can be from 2 to 4 hydroxyls per benzene. The alkyl radical of the alkyl gallates can have from 1 to 10 carbon atoms.

The polyisocyanate polyester polyols and polyether polyols and organic diamines are those well known to the casting art, for instance, U.S. 2,620,516 or U.S. 2,764,565 and these are used at an excess of 1 to 3.5 moles of organic polyisocyanate per mole of polyester polyol or polyether polyol and the diamine level is about 90 to 99 percent of the excess free NCO.

While certain representative embodiments and details have been shown for the purpose of illustrating the invention it will be apparent to those skilled in this art that various changes and modifications may be made therein without departing from the spirit or scope of the invention.

What is claimed is:

1. A method of accelerating the cure rate of a polyurethane reaction mixture containing a ketone diamine curative, said ketone being selected from acetone, methyl ethyl ketone and methyl isobutyl ketone, comprising forming a prepolymer by reacting an excess of an organic polyisocyanate with the hydroxyl containing compound of 500 to 7000 molecular weight selected from the class consisting of hydrocarbon polyols, polyester polyols, and polyether polyols, mixing the prepolymer with a ketone organic diamine curative to form a polyurethane reaction mixture, and reacting the polyurethane reaction mixture in the presence of an accelerating amount of an accelerator selected from the class consisting of polyhydroxyl benzene containing vicinal hydroxyl groups, and polyhydroxyl benzophenone containing 2 to 4 hydroxyl groups.

2. The method of claim 1 wherein the amount of accelerator is 0.1 to 2 parts per hundred of the polyurethane.

3. The method of claim 1 wherein the accelerator is a polyhydroxyl benzene selected from the class of catechol, pyrogallol and alkyl gallate where the alkyl radical contains from 1 to 10 carbon atoms.

4. The method of claim 1 wherein the accelerator is polyhydroxyl carbonyl benzene consisting of 2,2',4,4'-tetrahydroxybenzophenone, 2,4,5 - trihydroxybutyrophenone and 2,4-dihydroxybenzophenone.

5. The method of claim 1 wherein the organic polyisocyanate is selected from the class of alicyclic polyisocyanate and aliphatic polyisocyanate.

(References on following page)

References Cited

UNITED STATES PATENTS

| | | | |
|---|---|---|---|
| 2,970,066 | 1/1961 | Brasure | 117—33.3 |
| 2,984,645 | 5/1961 | Hoeschele | 260—45.8 |
| 3,023,192 | 2/1962 | Shivers | 260—75 |
| 3,113,880 | 12/1963 | Hoeschele et al. | 106—187 |
| 3,635,906 | 1/1972 | Jayawant | 260—77.5 |
| 3,463,748 | 1/1969 | Scheibelhoffer | 260—18 |

OTHER REFERENCES

Hackh's Chemical Dictionary, 3rd ed., McGraw-Hill, New York (1944), p. 894.

DONALD E. CZAJA, Primary Examiner

H. S. COCKERAM, Assistant Examiner

U.S. Cl. X.R.

260—75 NH, 77.5 AB, 77.5 AM

PO-1050
(5/69)

UNITED STATES PATENT OFFICE
CERTIFICATE OF CORRECTION

Patent No. 3,784,521            Dated  January 8, 1974

Inventor(s)   Anthony F. Finelli and John R. Stanley

It is certified that error appears in the above-identified patent and that said Letters Patent are hereby corrected as shown below:

```
Column 1, line 31, change "treaed" to -- treated --;
         line 35, cancel the last "the";
Column 2, line 12, change "polyhydroxy-" to
                          -- polyhydroxyl- --;
Column 3, Table 2, after the table insert:
                   -- (1) Fluid after 48. -- ;
         line 51, change "100" to -- 1,000 --;
Column 4, Table 6, line 13, change "3, 00" to -- 3,000 --.
```

Signed and sealed this 5th day of November 1974.

(SEAL)
Attest:

McCOY M. GIBSON JR.                C. MARSHALL DANN
Attesting Officer                  Commissioner of Patents